(12) United States Patent  
Suzuki

(10) Patent No.: US 9,325,265 B2  
(45) Date of Patent: Apr. 26, 2016

(54) MOTOR-DRIVEN APPLIANCE AND BATTERY PACK

(71) Applicant: MAKITA CORPORATION, Anjo-shi, Aichi (JP)

(72) Inventor: Hitoshi Suzuki, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 136 days.

(21) Appl. No.: 14/168,395

(22) Filed: Jan. 30, 2014

(65) Prior Publication Data

US 2014/0217934 A1    Aug. 7, 2014

(30) Foreign Application Priority Data

Feb. 7, 2013   (JP) .................................. 2013-022390

(51) Int. Cl.
*H02P 7/285* (2006.01)
*B25F 5/00* (2006.01)

(52) U.S. Cl.
CPC .. *H02P 7/285* (2013.01); *B25F 5/00* (2013.01)

(58) Field of Classification Search
CPC ...................................................... H02P 7/285
USPC ........................................................ 318/139
See application file for complete search history.

(56) References Cited

U.S. PATENT DOCUMENTS

| 2005/0077878 | A1 | 4/2005 | Carrier et al. | |
| 2011/0157752 | A1* | 6/2011 | Sakanobe et al. | 361/18 |
| 2013/0082627 | A1* | 4/2013 | Ichikawa et al. | 318/139 |

FOREIGN PATENT DOCUMENTS

| JP | A-09-285977 | 11/1997 |
| WO | WO 2011/090220 A2 | 7/2011 |
| WO | WO 2013/014914 A2 | 1/2013 |

OTHER PUBLICATIONS

Extended European Search Report issued in European Patent Application No. 14153661.5 on May 22, 2014.

* cited by examiner

*Primary Examiner* — Erick Glass
(74) *Attorney, Agent, or Firm* — Oliff PLC

(57) ABSTRACT

A motor-driven appliance includes a battery; a motor including permanent magnets as field magnets; a momentary maximum current upper limit storage unit in which a predetermined momentary maximum current upper limit is stored; a current detection unit that detects a current flowing in the motor; a current threshold setting unit that generates a current threshold based on the momentary maximum current upper limit, and outputs the generated current threshold; a current exceedance determination unit that determines whether the current detected by the current detection unit has become equal to or greater than the current threshold, and outputs an interruption signal used to interrupt a current path from the battery to the motor when the detected current has become equal to or greater than the current threshold; and a current flow interruption unit that interrupts the current path when the interruption signal is outputted from the current exceedance determination unit.

14 Claims, 8 Drawing Sheets

MOTOR-DRIVEN APPLIANCE AND BATTERY PACK

CROSS-REFERENCE TO RELATED APPLICATIONS

This application claims the benefit of Japanese Patent Application No. 2013.022390 filed on Feb. 7, 2013 in the Japan Patent Office, the disclosures of which are incorporated herein by reference.

BACKGROUND

The present invention relates to a motor-driven appliance and a battery pack.

In a motor in which permanent magnets are used, when a current flowing in the motor (specifically, a current flowing in an armature) has become excessively large, demagnetization of the permanent magnets is caused under the influence of a magnetic field generated from the armature, depending on a level of the excessively large current. Since demagnetization of the permanent magnets in the motor causes a change in characteristics of the motor, it is necessary to take some measures to suppress occurrence of demagnetization.

JPH09-285977 describes a technique in which, in order to prevent demagnetization due to a rush current at the time of activation of a motor, a resistor is inserted in a current path to the motor, and in which control is performed by a triac so that the current flowing at the time of the activation rises gradually.

SUMMARY

As described in JPH09.285977, when the resistor is inserted in the current path, power loss due to resistance occurs at all times during operation of the motor and, thus, a remaining capacity of a battery is thereby decreased faster. Moreover, in the method for controlling the current at the time of activation by means of the triac, although a rush current at the time of the activation can be prevented, an excessively large current generated during a normal operation after the activation cannot be dealt with. As seen from the above, the technique of preventing demagnetization described in JPH09-285977 has problems such as that battery power is forced to be sacrificed and that effects of suppressing demagnetization are limited.

It is one aspect of the present invention, in a motor-driven appliance, to provide a technique that enables effective suppression of demagnetization of permanent magnets within a motor over a whole operation period of the motor, while suppressing unnecessary power consumption of a battery.

A motor-driven appliance according to a first aspect of the present invention includes a battery, a motor, a momentary maximum current upper limit storage unit, a current detection unit, a current threshold setting unit, a current exceedance determination unit, and a current flow interruption unit.

The motor includes permanent magnets as field magnets, and is operated by electric power from the battery. In the momentary maximum current upper limit storage unit, a predetermined momentary maximum current upper limit is stored. The current detection unit detects a current flowing in the motor. The current threshold setting unit generates a current threshold based on the momentary maximum current upper limit stored in the momentary maximum current upper limit storage unit, and outputs the generated current threshold. The current exceedance determination unit determines whether the current detected by the current detection unit has become equal to or greater than the current threshold, and outputs an interruption signal used to interrupt a current path from the battery to the motor when the detected current has become equal to or greater than the current threshold. The current flow interruption unit interrupts the current path when the interruption signal is outputted from the current exceedance determination unit.

The current detection unit is capable of continuously detecting the current flowing in the motor and, even when, for example, a great change has been momentarily induced, such a momentary current value changed can be detected. The current threshold setting unit sets the current threshold based on the momentary maximum current upper limit so that the current path is interrupted before the current flowing in the motor reaches the momentary maximum current upper limit.

In the thus-configured motor-driven appliance, even when the current flowing in the motor is momentarily increased sharply, such a momentarily sharply-increased current is detected by the current detection unit. Then, the current exceedance determination unit determines whether the detected current (current in the course of sharp increase) is equal to or greater than the current threshold (such a determination is hereinafter also referred to as "current exceedance determination"), and outputs the interruption signal when the detected current has become equal to or greater than the current threshold. Thus, by the current threshold setting unit's appropriate setting of the current threshold based on the momentary maximum current upper limit, the current path can be interrupted before demagnetization of the permanent magnets is caused.

As a result, according to the motor-driven appliance of the present invention, it is possible to effectively suppress demagnetization of the permanent magnets within the motor over a whole operation period of the motor, while suppressing unnecessary power consumption of the battery.

Although the momentary maximum current upper limit can be decided arbitrarily, it is recommended that the momentary maximum current upper limit be a value set in advance based on a current value that causes demagnetization of the permanent magnets when such a current is caused to flow to the motor. When the momentary maximum current upper limit is the value decided based on the current value that causes demagnetization (based on a predetermined value within a range of the current value that causes demagnetization), the current threshold setting unit can generate a more appropriate value as the current threshold based on such a momentary maximum current upper limit.

More specifically, the momentary maximum current upper limit is preferably a maximum value of a current that has no risk of causing demagnetization of the permanent magnets when such a current is caused to flow to the motor, or a predetermined value less than the maximum value.

When the momentary maximum current upper limit is set to such a value, there is no risk of demagnetization unless the current flowing in the motor exceeds the momentary maximum current upper limit. Thus, it is possible to generate the current threshold easily and appropriately based on the momentary maximum current upper limit.

Furthermore, it is recommended that the current threshold setting unit be designed to generate the current threshold with certain degree of margin with respect to the momentary maximum current upper limit. Specifically, it is recommended that the current threshold setting unit be designed to generate, as the current threshold, a value lower than the momentary maximum current upper limit by a predetermined amount. The value is decided so that the current path is interrupted by the current flow interruption unit before the current flowing in the motor exceeds the momentary maximum current upper limit when the current exceedance determination unit determines that the detected current is equal to or greater than the current threshold based on the momentary maximum current upper limit stored in the momentary maximum current upper limit storage unit.

By setting the current threshold to the value with a certain degree of margin with respect to the momentary maximum current upper limit as above, the current flow can be interrupted before the current flowing in the motor exceeds the momentary maximum current upper limit, and occurrence of demagnetization can be suppressed more reliably.

It is recommended that the current exceedance determination unit be configured to perform determination of whether the current detected by the current detection unit has become equal to or greater than the current threshold (current exceedance determination) and output of the interruption signal, by a hardware circuit without going through a software process by a computer.

By accomplishing a function of the current exceedance determination unit by a hardware circuit (by a configuration not going through a software process, i.e., by a non-programmable configuration), a time elapsing from when the detected current has become equal to or greater than the current threshold till when the current exceedance determination unit outputs the interruption signal can be made shorter. As a result, even when the current flowing in the motor has become equal to or greater than the current threshold momentarily, it is possible to detect that and interrupt the current path faster.

The motor-driven appliance of the present invention may be configured to include a battery pack and a main body to which the battery pack is detachably attached. Specifically, the battery pack has at least a battery housed therein, and the main body has at least the motor and the momentary maximum current upper limit storage unit mounted therein. In the case where the battery pack and the main body are configured separately from each other as above, if the momentary maximum current upper limit is stored on the part of the main body, it is possible that the current exceedance determination is performed using a current threshold corresponding to the main body (corresponding to the motor).

In the case where the motor-driven appliance is configured to include the battery pack and the main body, it can be arbitrarily decided to which and how the current detection unit, the current threshold setting unit, the current exceedance determination unit, and the current flow interruption unit are provided.

For example, a configuration is possible in which the main body includes a first control unit that controls the motor; the first control unit is designed to accomplish, from among functions of the current threshold setting unit, at least an acquisition function for acquiring the momentary maximum current upper limit stored in the momentary maximum current upper limit storage unit; and the current threshold setting unit is designed to generate the current threshold based on the momentary maximum current upper limit acquired by the acquisition function.

By having at least some of the functions (at least the acquisition function) of the current threshold setting unit also accomplished by the first control unit that controls the motor within the main body as above, simplification of the configuration of the main body is enabled, cost reduction of the main body is enabled, and thus, cost reduction of the motor-driven appliance is enabled.

In the case where the main body includes the first control unit as above, a further configuration as below is possible. Specifically, the battery pack includes a second control unit that monitors a state of the battery. The first control unit includes an upper limit information output unit. This upper limit information output unit is designed to accomplish the above-described acquisition function from among the functions of the current threshold setting unit, that is, is designed to acquire the momentary maximum current upper limit stored in the momentary maximum current upper limit storage unit and to output upper limit information indicating the momentary maximum current upper limit to the second control unit. The second control unit accomplishes, from among the functions of the current threshold setting unit, at least a current threshold setting information generation function that acquires the upper limit information outputted from the upper limit information output unit in the main body and generates current threshold setting information indicating the current threshold based on the upper limit information. The current threshold setting unit includes a threshold generation unit provided in the battery pack. This threshold generation unit generates the current threshold based on the current threshold setting information generated by the current threshold setting information generation function in the second control unit. The threshold generation unit may be designed to be provided separately from the second control unit, or the second control unit may be designed to be equipped also with the function of the threshold generation unit.

By having at least some of the functions (at least the current threshold setting information generation function) of the current threshold setting unit also accomplished by the second control unit that monitors a state of the battery within the battery pack as above, simplification of the configuration of the battery pack is enabled, cost reduction of the battery pack is enabled, and thus, cost reduction of the motor-driven appliance is enabled.

Moreover, by acquiring the upper limit information from the part of the main body and generating the current threshold based on the acquired upper limit information on the part of the battery pack, even when the battery pack is attached to a wide variety of main bodies, it is possible to generate an appropriate current threshold corresponding to such a main body and to perform an appropriate current exceedance determination corresponding to such a main body.

Furthermore, the battery pack may be designed to include the current exceedance determination unit, and the main body may be designed to include the current flow interruption unit. In such a case, it is recommended that the battery pack be designed to further include an interruption signal output unit that outputs the interruption signal to the main body when the current exceedance determination unit determines that the detected current has become equal to or greater than the current threshold, and that the current flow interruption unit on the part of the main body be designed to interrupt the current path when the interruption signal is inputted from the battery pack.

By having the interruption of the current path based on the interruption signal performed on the part of the main body while having the current exceedance determination performed on the part of the battery pack as above, size reduction and cost reduction of the battery pack are enabled.

The current exceedance determination unit and the current flow interruption unit may be designed to be mounted in the battery pack. Depending on the configuration of the main body, there is a possibility that the configuration of the motor-driven appliance is such that, even when the interruption signal is outputted from the battery pack to the main body, interruption of the current path based on the interruption signal cannot be performed on the part of the main body. Therefore, by mounting the current exceedance determination unit and the current flow interruption unit in the battery pack, it becomes possible, regardless of the configuration of the main body, to interrupt the current path on the part of the battery pack when the detected current has become equal to or greater than the current threshold.

The current detection unit, the current threshold setting unit, the current exceedance determination unit, and the current flow interruption unit may be designed to be mounted in the main body. This makes it possible to accomplish each function for suppressing demagnetization within the main body without relying on the battery pack. Therefore, this is especially useful in a case where there is a possibility that a battery pack having a very simple configuration (e.g., a configuration without the above-described second control unit) is attached to the main body.

The main body may be designed to include an operation switch and an operation amount signal output unit that outputs an operation amount signal indicating an operation amount of the operation switch to the battery pack, and the battery pack may be designed to include the current detection unit, the current threshold setting unit, the current exceedance determination unit, and the current flow interruption unit. In such a case, it is recommended that the battery pack be designed to further include a switching element that conducts and interrupts the current path from the battery to the motor; and a control unit that controls the current flowing from the battery to the motor by turning on and off the switching element based on the operation amount signal inputted from the main body, and that the current flow interruption unit be designed to interrupt the current path by forcibly turning off the switching element when the interruption signal is outputted from the current exceedance determination unit.

By accomplishing most of the respective functions for suppressing demagnetization within the battery pack as above, it becomes possible to suppress demagnetization while realizing simplification of the configuration within the main body.

The current threshold setting unit may be configured to generate the current threshold of an analog form and to output the generated current threshold to the current exceedance determination unit. By generating the current threshold of an analog form, the current exceedance determination unit can be realized with a simple hardware circuit, and when the detected current has become equal to or greater than the current threshold, it is possible to detect that in a short period of time.

The motor-driven appliance of the present invention may be designed to further include a temperature detection unit that detects a temperature of the permanent magnets in the motor directly or indirectly, and the current threshold setting unit may be designed to generate the current threshold based on the momentary maximum current upper limit and the temperature detected by the temperature detection unit.

Generally, the motor-driven appliance is often used outdoors, and is used under a wide range of temperature environments. On the other hand, demagnetization characteristics of the permanent magnets can be affected by changes in temperature, and vary depending on a type (material) of the permanent magnets. Some become readily demagnetized as the temperature is raised and, in contrast, others become readily demagnetized as the temperature is lowered. Therefore, by reflecting the temperature of the permanent magnets in generating the current threshold, it becomes possible to suppress demagnetization even when the motor-driven appliance is used under various temperature environments.

A battery pack according to a second aspect of the present invention is a battery pack used attached to a main body of a motor-driven appliance, and includes a battery, a current detection unit, a current threshold setting unit, and a current exceedance determination unit.

The battery is designed to supply electric power to a motor that is mounted in the main body and includes permanent magnets as field magnets. The current detection unit detects a current flowing from the battery to the motor. The current threshold setting unit generates a current threshold based on a predetermined momentary maximum current upper limit stored in the main body, and outputs the generated current threshold. The current exceedance determination unit determines whether the current detected by the current detection unit has become equal to or greater than the current threshold, and outputs an interruption signal used to interrupt a current path from the battery to the motor when the detected current has become equal to or greater than the current threshold.

In the thus-configured battery pack, even when the current flowing in the motor on the part of the main body is momentarily increased sharply, such a momentarily sharply-increased current is detected by the current detection unit. Then, the current exceedance determination unit performs a current exceedance determination, and outputs the interruption signal when the detected current has become equal to or greater than the current threshold. Thus, effects similar to those in the first aspect of the present invention can be exerted.

BRIEF DESCRIPTION OF THE DRAWINGS

Preferred embodiments of the present invention will be described below with reference to accompanying drawings, in which.

DETAILED DESCRIPTION OF THE PREFERRED EMBODIMENTS

First Embodiment

Figure 1:
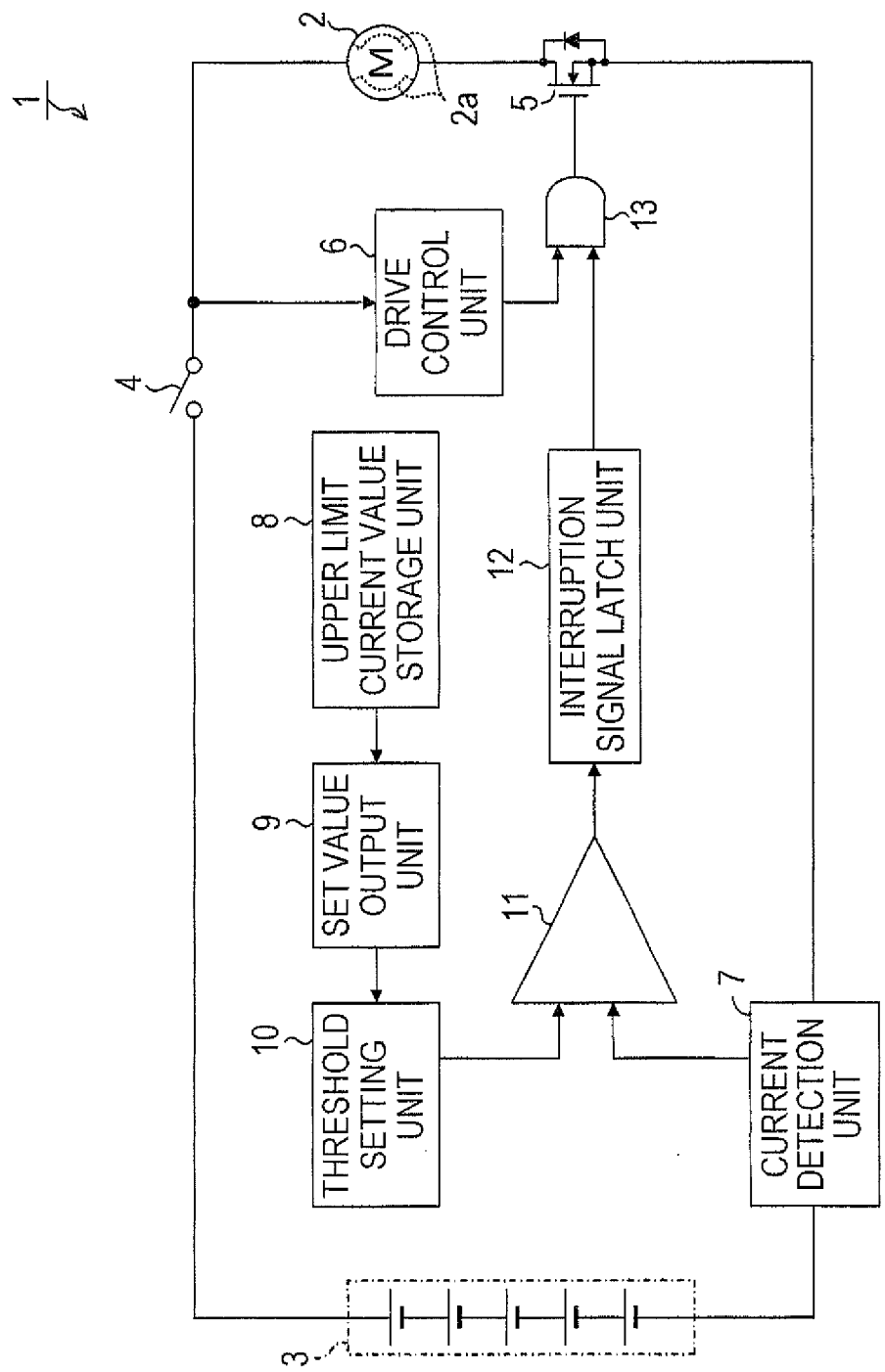
FIG. 1 is a block diagram showing an electrical configuration of a motor-driven appliance according to a first embodiment of the present invention.

A motor-driven appliance 1 of a first embodiment shown in FIG. 1 is configured as an electric power tool. More specifically, the motor-driven appliance 1 is configured as a driver drill used to drill a hole in a workpiece material and/or to perform a fastening operation of a screw.

As shown in FIG. 1, the motor-driven appliance 1 of the present embodiment includes a motor 2, a battery 3, a main switch 4, a driving FET 5, a drive control unit 6, a current detection unit 7, an upper limit current value storage unit 8, a set value output unit 9, a threshold setting unit 10, a current exceedance determination unit 11, an interruption signal latch unit 12, and an AND circuit 13.

The motor 2 is a brushed direct current (DC) motor including permanent magnets 2a as field magnets, and is operated by receiving power from the battery 3. The battery 3 includes a plurality of cells (five in the present embodiment) connected in series. Each of the cells of the present first embodiment is configured as a rechargeable battery cell (e.g., a lithium-ion rechargeable battery cell).

The main switch 4 is inserted in a path on an upstream side of the motor 2 (on a positive side of the battery 3) in a current path from the battery 3 to the motor 2, and conducts (turns on) and interrupts (turns off) this current path. The main switch 4 is on/off-operated by a user or the like of the motor-driven appliance 1.

The driving FET 5 is inserted in a path on a downstream side of the motor 2 (on a negative side of the battery 3) in the current path from the battery 3 to the motor 2, and conducts (turns on) and interrupts (turns off) this current path. The driving FET 5 is an N-channel MOSFET in the present embodiment. The driving FET 5 is turned on and off by a drive signal outputted from the AND circuit 13. Specifically, when the drive signal is at a High level (H level), the driving FET 5 is turned on, and when the drive signal is at a Low level (L level), the driving FET 5 is turned off and the current path is thereby interrupted.

The AND circuit 13 calculates a logical product of a control signal from the drive control unit 6 and an interruption signal from the interruption signal latch unit 12, and outputs the calculated result to a gate of the driving FET 5.

The drive control unit 6 outputs the control signal of the L level to the AND circuit 13 when the main switch 4 is in an off state, and outputs the control signal of the H level to the AND circuit 13 when the main switch 4 is in an on state. Due to this, if the interruption signal from the interruption signal latch unit 12 is at the H level when the main switch 4 is turned on, the driving FET 5 is turned on, and a current flows from the battery 3 to the motor 2 to thereby operate (rotate) the motor 2.

The current detection unit 7 detects a current flowing in the motor 2. The current detection unit 7 is configured to include, for example, a shunt resistor having a very small resistance value, and a voltage of the shunt resistor is inputted into the current exceedance determination unit 11 as an analog signal indicating a current value of the current flowing in the motor 2. Therefore, the current detection unit 7 can continuously detect the current flowing in the motor 2. That is, even when the current flowing in the motor 2 momentarily varies greatly, the current in the course of such variation can be detected.

The current exceedance determination unit 11 compares the current detected by the current detection unit 7 (the detected current) and a current threshold set by the threshold setting unit 10 (i.e., generated and outputted by the threshold setting unit 10) with each other. The current exceedance determination unit 11 outputs a signal of the H level when the detected current is lower than the current threshold, and outputs a signal of the L level (interruption signal) when the detected current is equal to or greater than the current threshold.

The current exceedance determination unit 11 is constituted by a hardware circuit, which can perform the above-described comparison and output of the signal indicating a result of determination without a software process being performed by a computer (i.e., which is not programmable). Specifically, the current exceedance determination unit 11 of the present embodiment is constituted by an analog comparator.

When the interruption signal of the L level is outputted from the current exceedance determination unit 11 (specifically, when the output signal is changed from the H level into the L level), the interruption signal latch unit 12 latches the interruption signal of the L level for a given period of time from such output, and outputs the latched interruption signal to the AND circuit 13.

When the detected current is equal to or greater than the current threshold, the interruption signal of the L level is outputted from the current exceedance determination unit 11, and the interruption signal is latched by the interruption signal latch unit 12 for a given period of time and outputted to the AND circuit 13. Due to this, while the interruption signal is latched, the driving FET 5 is forcibly turned off regardless of the control signal from the drive control unit 6, and the current flowing in the motor 2 is forcibly interrupted.

How long the interruption signal latch unit 12 latches the interruption signal outputted from the current exceedance determination unit 11 can be arbitrarily determined. For example, a time period fixed in advance may be applied, a time period until the main switch 4 is turned off may be applied, or a time period until the main switch 4 is turned on again after once turned off may be applied.

In the upper limit current value storage unit 8, an upper limit current value, which is an upper limit of the current flowing in the motor 2, is stored. This upper limit current value is set to a value that does not lead to occurrence of demagnetization of the permanent magnets 2a in the motor 2. Specifically, the upper limit current value is set to a maximum value (hereinafter also referred to as a maximum limit value) of a current that has no risk of causing demagnetization of the permanent magnets 2a when such a current is caused to flow in the motor 2 (even when that is a momentary current flow), or to a predetermined value less than the maximum limit value.

How much current flowing in the motor 2 will cause demagnetization of the permanent magnets 2a within the motor 2 (specifically, the demagnetization will be caused by magnetic field generated from an armature by such a current) can be theoretically or experimentally known (or inferred) from various requirements such as a type and form of the permanent magnets 2a and a relative positional relationship between the permanent magnets 2a and the armature. In other words, up to how much current at a maximum has no risk of causing demagnetization can be grasped in advance.

Therefore, based on the maximum limit value in a range of the current that has no risk of causing demagnetization, the maximum limit value or the predetermined value less than the maximum limit value can be set as the upper limit current value. In the present embodiment, the maximum limit value is stored in the upper limit current value storage unit 8 as the upper limit current value.

The set value output unit 9 calculates the current threshold based on the upper limit current value stored in the upper limit current value storage unit 8, and outputs threshold information indicating the calculated current threshold to the threshold setting unit 10. In the present embodiment, the set value output unit 9 outputs, as the threshold information, a threshold setting PWM signal, which is a pulse signal of a duty ratio corresponding to the calculated current threshold.

Based on the threshold setting PWM signal outputted from the set value output unit 9, the threshold setting unit 10 sets (generates) the current threshold indicated by the duty ratio of the threshold setting PWM signal, and outputs the current threshold to the current exceedance determination unit 11. In the present embodiment, the threshold setting unit 10 includes an LPF (low-pass filter), by which the inputted threshold setting PWM signal is smoothed to generate the current threshold of an analog form (analog voltage value).

Here, significance of constituting the current exceedance determination unit 11 by the non-programmable hardware circuit will be briefly described. When a large current exceeding the maximum limit value flows in the motor 2, even momentarily, and a large opposing magnetic field is applied to the permanent magnets 2a, demagnetization of the permanent magnets 2a is caused.

A conventionally widely-used battery such as a nickel-cadmium storage battery, for example, has a standard discharge capacity and, therefore, when a large current flows, a battery output voltage is reduced due to an internal resistance of the battery and an excessive rise in current is thereby suppressed. That is, there have been few cases where such a large current flows as to cause demagnetization on the part of the motor, due to characteristics of the battery itself.

On the other hand, an internal resistance of a battery has become very small recently, due to improved performance of the battery. Therefore, even when a current flowing in the motor has become large, a battery output voltage is not decreased very much and, thus, when an excessive current flows, the opposing magnetic field applied to the permanent magnets also becomes larger and larger, and demagnetization of the permanent magnets could thereby be caused.

A circuit and the like for protecting a motor from overcurrent have been already suggested and put into practical use variously. However, since conventional overcurrent protection methods have a configuration in which current flow is interrupted after going through a software process by a microcomputer, a time lag (response delay) until a current path is interrupted after a current actually goes into an overcurrent state is comparatively large. Originally, a conventional overcurrent protection is mainly intended to protect overheat of a motor and/or a battery due to overcurrent and, thus, a time lag from recognition of overcurrent till actual interruption of current flow is acceptable to a certain extent. Therefore, no problem arises if it takes some time for a microcomputer to perform a software process.

When considering only suppression of occurrence of demagnetization, occurrence of demagnetization can be suppressed if the current threshold is set to a lower value in consideration of a response delay. To do so, however, it is necessary to set the current threshold to a value far lower than the maximum limit value, and a proper operation of the motor is thereby affected.

Moreover, in the conventional overcurrent protection, a momentary large current such as a rush current is often rather cancelled as an error. Specifically, in most of the conventional overcurrent protection, attention is focused to an average current rather than a momentary current, and a momentary large current is often rather cancelled by averaging the detected current or by removing high-frequency components from the detected current.

However, in terms of demagnetization of the permanent magnets, when a large current exceeding the maximum limit value flows even momentarily, demagnetization is caused, as has been already described. Therefore, in order to suppress demagnetization, when a current is rising excessively, it is necessary to promptly reduce or stop the current flow before the current exceeds the maximum limit value. Thus, in the conventional overcurrent protection method, in which momentary current components are cancelled from the detected current, demagnetization due to a momentary large current cannot be prevented from occurring.

Therefore, the present embodiment is designed to set the current threshold based on the upper limit current value set in accordance with properties inherent in the motor 2; to determine, based on the current threshold and the detected current, whether the detected current has become equal to or greater than the current threshold by performing a hardware process without performing a software process; and to output the interruption signal when the detected current has become equal to or greater than the current threshold to thereby forcibly stop the current flowing to the motor 2. Since this is a process performed by a hardware circuit and not through a software process, when the detected current has become equal to or greater than the current threshold, the current flow can be forcibly stopped in a very short period of time.

More specific explanation will be given below about the current threshold, which is set by the set value output unit 9. The set value output unit 9 calculates the current threshold such that, in a case where the current flowing in the motor 2 has become equal to or greater than the current threshold, the interruption signal of the L level is outputted from the current exceedance determination unit 11 (and thus, the driving FET 5 is forcibly turned off to forcibly stop the current flowing to the motor 2) before the current afterwards exceeds the upper limit current value.

Furthermore, the set value output unit 9 sets the current threshold to a value lower than the upper limit current value by a predetermined amount in consideration of a response delay from the time when the detected current is determined to have become equal to or greater than the current threshold till the time when actually the current flowing to the motor 2 is forcibly stopped. More specifically, the set value output unit 9 sets the current threshold to a value of a level that is equal to or less than the upper limit current value and also that does not hinder a normal operation of the motor 2 (i.e., that is much higher than a current value required for the normal operation).

In the present embodiment, the current exceedance determination unit 11 is configured to operate with a process of the hardware circuit without performing a software process, as described above. Therefore, the above-described response delay in the present embodiment is considerably shorter than that in the conventional overcurrent protection method. Accordingly, the current threshold can be set to a value closer to the upper limit current value. This makes it possible to protect the motor 2 from a demagnetizing current while suppressing hindrance to a normal operation of the motor 2.

As described so far, in the motor-driven appliance 1 of the present first embodiment, the current detection unit 7 continuously detects the current flowing in the motor 2 and outputs the detected current as an analog signal, whereas the threshold setting unit 10 outputs the current threshold calculated based on the upper limit current value in an analogous manner. Then, the current exceedance determination unit 11 compares the detected current and the current threshold with each other, and when the detected current has become equal to or greater than the current threshold, the current exceedance determination unit 11 outputs the interruption signal of the L level, and forcibly turns off the driving FET 5 to thereby forcibly stop the current flowing to the motor 2. Such a technique is neither the one in which rise in current is suppressed by inserting a resistor in the current path nor the one that can cope with only a rush current at the time of activation, as described in JPH09-285977.

Accordingly, it is possible to effectively suppress demagnetization of the permanent magnets 2a within the motor 2 over the whole period of operation of the motor 2, while suppressing unnecessary power consumption of the battery 3.

The current exceedance determination unit 11 is constituted by the hardware circuit (in the present example, an analog comparator) that does not go through a software process by a computer. The fact that the detected current and the current threshold, which are subjects of process to be inputted, are both analog signals is also one of the factors that enable such a simple configuration by the hardware circuit. Thus, even when the current flowing in the motor 2 has become equal to or greater than the current threshold momentarily, it is possible to detect such a state and interrupt the current path more quickly (before the current exceeds the upper limit current value), despite such a simple configuration.

The interruption signal of the L level outputted from the current exceedance determination unit 11 is latched by the interruption signal latch unit 12 for the given period of time, and the latched interruption signal is outputted to the AND circuit 13. Thus, when the current flowing in the motor 2 rises to be equal to or greater than the current threshold, it is possible to forcibly stop the current flowing to the motor 2 for a necessary and sufficient period of time, and to further improve an effect of suppressing demagnetization of the permanent magnets 2a.

In the present embodiment, the upper limit current value storage unit 8 corresponds to an example of a momentary maximum current upper limit storage unit of the present invention; the driving FET 5 corresponds to an example of a current flow interruption unit of the present invention; and the configuration composed of the set value output unit 9 and the threshold setting unit 10 corresponds to an example of a current threshold setting unit of the present invention.

Second Embodiment

Next, a motor-driven appliance 20 of a second embodiment will be described with reference to FIG. 2. The motor-driven appliance 20 of the present embodiment shown in FIG. 2 is also configured as a driver drill, similarly to the motor-driven appliance 1 of the first embodiment.

Figure 2:
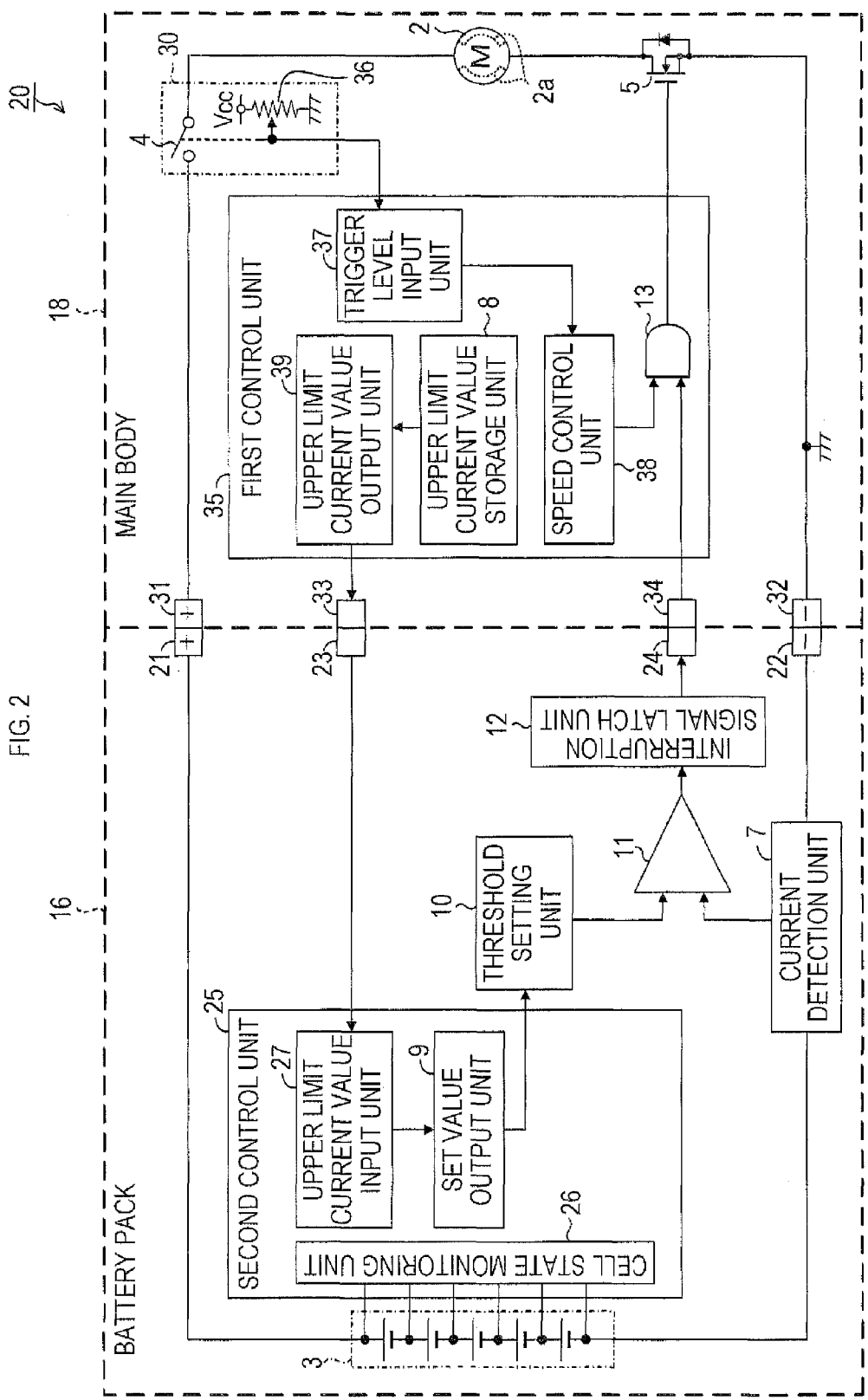
FIG. 2 is a block diagram showing an electrical configuration of a motor-driven appliance according to a second embodiment of the present invention.

As shown in FIG. 2, the motor-driven appliance 20 of the present embodiment includes a battery pack 16 and a main body 18. The battery pack 16 can be detachably attached to the main body 18. FIG. 2 shows a state in which the battery pack 16 is attached to the main body 18 and the both are electrically connected to each other.

The motor-driven appliance 20 of the present embodiment also includes the motor 2, the battery 3, the main switch 4, the driving FET 5, the current detection unit 7, the upper limit current value storage unit 8, the set value output unit 9, the threshold setting unit 10, the current exceedance determination unit 11, the interruption signal latch unit 12, and the AND circuit 13, similarly to the motor-driven appliance 1 of the first embodiment. Therefore, these respective elements, which are the same as those of the first embodiment, are assigned with the same reference numerals as those in the first embodiment, and detailed explanations of such elements are not repeated here. An explanation will be given below mainly about differences from the motor-driven appliance 1 of the first embodiment.

The battery pack 16 includes the battery 3, a second control unit 25, the current detection unit 7, the threshold setting unit 10, the current exceedance determination unit 11, and the interruption signal latch unit 12. Although not shown in the drawings, the battery pack 16 includes a power circuit that steps down a voltage of the battery 3 to a control voltage of a predetermined voltage value, and most of the units within the battery pack 16, such as the second control unit 25, are operated using the control voltage from this power circuit as a power source.

A positive electrode of the battery 3 is connected to a positive terminal 21, and a negative electrode of the battery 3 is connected to a negative terminal 22 via the current detection unit 7. The latched interruption signal from the interruption signal latch unit 12 is outputted to the main body 18 via a latched interruption signal output terminal 24.

The second control unit 25 includes a cell state monitoring unit 26, an upper limit current value input unit 27, and the set value output unit 9. The cell state monitoring unit 26 monitors various states of the battery 3, such as a voltage of each cell in the battery 3 and a remaining capacity of the battery 3, and executes various processes in accordance with the monitored results.

The upper limit current value input unit 27 receives an upper limit current value supplied from the main body 18 via an upper limit current value input terminal 23. The set value output unit 9 calculates the current threshold, as explained in the first embodiment, based on the upper limit current value supplied to the upper limit current value input unit 27, and outputs the threshold setting PWM signal indicating the calculated current threshold to the threshold setting unit 10. Details will be described later with reference to FIG. 3.

The main body 18 includes the motor 2, the driving FET 5, a trigger switch unit 30, and a first control unit 35. As for the driving FET 5, a drain thereof is connected to the motor 2, and a source thereof is connected to a negative terminal 32. Although not shown in the drawings, the main body 18 includes a power circuit that steps down a voltage, which is supplied from the battery 3 when the battery pack 16 is attached to the main body 18, to a control voltage Vcc of a predetermined voltage value. Most of the units except for the motor 2 within the main body 18, such as the first control unit 35, are operated using the control voltage Vcc from this power circuit as a power source.

When the battery pack 16 is attached to the main body 18, the positive terminal 21 of the battery pack 16 and a positive terminal 31 of the main body 18 are electrically connected to each other; and so are the negative terminal 22 of the battery pack 16 and the negative terminal 32 of the main body 18; the upper limit current value input terminal 23 of the battery pack 16 and an upper limit current value output terminal 33 of the main body 18; and the latched interruption signal output terminal 24 of the battery pack 16 and a latched interruption signal input terminal 34 of the main body 18.

The trigger switch unit 30 includes a trigger (not shown) that is directly pull-operated by a user, the main switch 4 that is turned on and off in accordance with an operation state of the trigger, and an operation amount signal output unit 36. The main switch 4 is connected at one end thereof to the positive terminal 31, and at the other end thereof to the motor 2. The operation amount signal output unit 36 includes a variable resistor, in which a resistance value varies in accordance with an amount of pulling operation of the trigger by the user, and outputs an operation amount signal corresponding to the amount of pulling operation. When the user pulls the trigger slightly, the main switch 4 is turned on to thereby electrically conduct a current path between the positive terminal 31 and the motor 2. When the user further pulls the trigger in this state, an operation amount signal corresponding to the amount of pulling operation is inputted into the first control unit 35.

The first control unit 35 includes the upper limit current value storage unit 8, an upper limit current value output unit 39, a trigger level input unit 37, a speed control unit 38, and the AND circuit 13. The upper limit current value output unit 39 reads out (acquires) the upper limit current value stored in the upper limit current value storage unit 8, and outputs the upper limit current value to the battery pack 16 via the upper limit current value output terminal 33.

The trigger level input unit 37 receives the operation amount signal from the trigger switch unit 30, and outputs operation amount information corresponding to the operation amount signal to the speed control unit 38. The speed control unit 38 generates the PWM drive signal for causing the motor 2 to rotate at a speed corresponding to the trigger pulling amount, based on the operation amount information inputted from the trigger level input unit 37. Specifically, the speed control unit 38 generates the PWM drive signal having a duty ratio corresponding to the pulling amount of the trigger and, then, outputs the generated PWM drive signal to the AND circuit 13.

Into the AND circuit 13, the latched interruption signal outputted from the battery pack 16 is inputted via the latched interruption signal input terminal 34. This latched interruption signal is the H level unless the current flowing in the motor 2 becomes equal to or greater than the current threshold. Therefore, in a normal operation state where the current flowing in the motor 2 is lower than the current threshold, the drive signal outputted from the AND circuit 13 is the same as the PWM drive signal outputted from the speed control unit 38. That is, the rotation of the motor 2 is controlled to a speed corresponding to the pulling amount of the trigger. When the latched interruption signal of the L level is inputted from the battery pack 16, the drive signal from the AND circuit 13 becomes the L level regardless of the PWM drive signal from the speed control unit 38, and the driving FET 5 is forcibly turned off.

In the present embodiment, the first control unit 35 and the second control unit 25 are each constituted by a microcomputer including a CPU, a memory, an I/O, other peripheral circuits of various types, and the like.

Therefore, in the first control unit 35 of the main body 18, the upper limit current value storage unit 8 is a non-volatile memory, and functions of the speed control unit 38 are accomplished by the CPU's execution of programs. Also in the second control unit 25 of the battery pack 16, a part or a whole of functions of the cell state monitoring unit 26 and the set value output unit 9 are accomplished by the CPU's execution of programs. However, it goes without saying that the configuration in which the first control unit 35 and the second control unit 25 are each constituted by a microcomputer is merely an example.

Here, an explanation will be given, with reference to FIG. 3, about a threshold setting PWM signal generation process, which is executed by the second control unit 25 of the battery pack 16 in order to accomplish functions of the set value output unit 9. Upon starting operation by being supplied with the control voltage, the second control unit 25 starts the threshold setting PWM signal generation process shown in FIG. 3.

Figure 3:
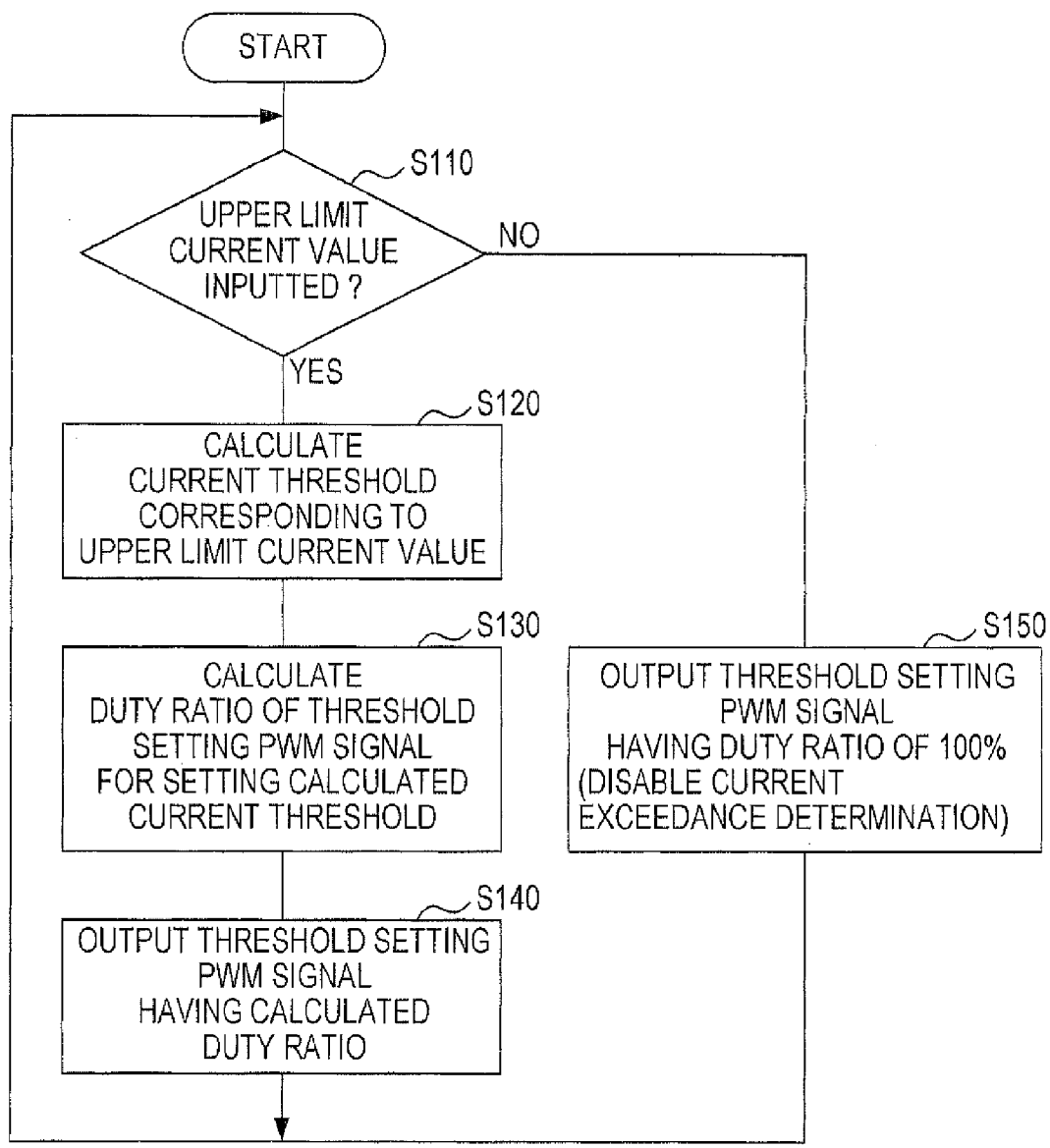
FIG. 3 is a flowchart showing a threshold setting PWM signal generation process, which is executed by a second control unit of a battery pack according to the second embodiment of the present invention.

Upon starting the threshold setting PWM signal generation process shown in FIG. 3, the second control unit 25 determines in S110 whether the upper limit current value has been inputted from the main body 18 into the upper limit current value input unit 27. When the upper limit current value has not been inputted, the threshold setting PWM signal having a duty ratio of 100% is outputted in S150. In other words, when the upper limit current value has not been inputted from the main body 18, current exceedance determination is disabled.

When the upper limit current value has been inputted from the main body 18 into the upper limit current value input unit 27, the current threshold corresponding to the inputted upper limit current value is calculated in S120. In S130, a duty ratio of the threshold setting PWM signal for setting the calculated current threshold is calculated. In 140, the threshold setting PWM signal having the calculated duty ratio is outputted to the threshold setting unit 10.

In the thus-configured motor-driven appliance 20 of the present second embodiment, the upper limit current value storage unit 8 is provided within the first control unit 35 of the main body 18, from which the upper limit current value is read out and outputted to the battery pack 16. Then, in the battery pack 16, the current threshold is calculated and generated based on the upper limit current value inputted from the main body 18, and outputted to the current exceedance determination unit 11.

Therefore, in the battery pack 16, an appropriate current threshold corresponding to the main body 18, to which the battery pack 16 is attached (i.e., corresponding to characteristics of the permanent magnets 2a in the motor 2), is generated, and an appropriate current exceedance determination based on the appropriate current threshold is performed.

In the main body 18, functions of the upper limit current value storage unit 8 and the upper limit current value output unit 39 are accomplished as one function of the first control unit 35. In other words, the first control unit 35, whose main function is control of the motor 2, is also equipped with the functions of the upper limit current value storage unit 8 and the upper limit current value output unit 39. This realizes simplification of the configuration of the main body 18, enables cost reduction of the main body 18, and thus, enables cost reduction of the motor-driven appliance 20.

In the battery pack 16, functions of the upper limit current value input unit 27 and the set value output unit 9 are accomplished as one function of the second control unit 25. In other words, the second control unit 25, whose main objective is to monitor a state of the battery 3, is also equipped with the functions of the upper limit current value input unit 27 and the set value output unit 9. This realizes simplification of the configuration of the battery pack 16, enables cost reduction of the battery pack 16, and thus, enables cost reduction of the motor-driven appliance 20.

Moreover, in the battery pack 16, since upper limit information is acquired from the main body 18 and the current threshold is generated based on the upper limit information, even when the battery pack 16 is attached to a wide variety of main bodies, an appropriate current threshold corresponding to characteristics of the permanent magnets 2a in the motor 2 included in such a main body can be generated and, thus, an appropriate current exceedance determination corresponding to the main body can be performed.

While the current exceedance determination by the current exceedance determination unit 11 is performed in the battery pack 16, forcible interruption of the current flowing in the motor 2 is performed on the part of the main body 18 in a case where the detected current is determined to be equal to or greater than the current threshold, in the current exceedance determination. Since execution of the forcible interruption of the current flow is left in charge of the part of the main body 18 as above, size reduction and cost reduction of the battery pack 16 are thereby enabled.

In the present embodiment, the trigger switch unit 30 corresponds to an example of an operation switch of the present invention; the upper limit current value output unit 39 corresponds to an example of an upper limit information output unit of the present invention; and the threshold setting unit 10 corresponds to an example of a threshold generation unit of the present invention. Moreover, the current exceedance determination unit 11 corresponds to an example of an interruption signal output unit of the present invention. Furthermore, the functions accomplished by the upper limit current value input unit 27 and the set value output unit 9 in the second control unit 25 of the battery pack 16 correspond to an example of a current threshold setting information generation function provided in a second control unit of the present invention.

Third Embodiment

Figure 4:
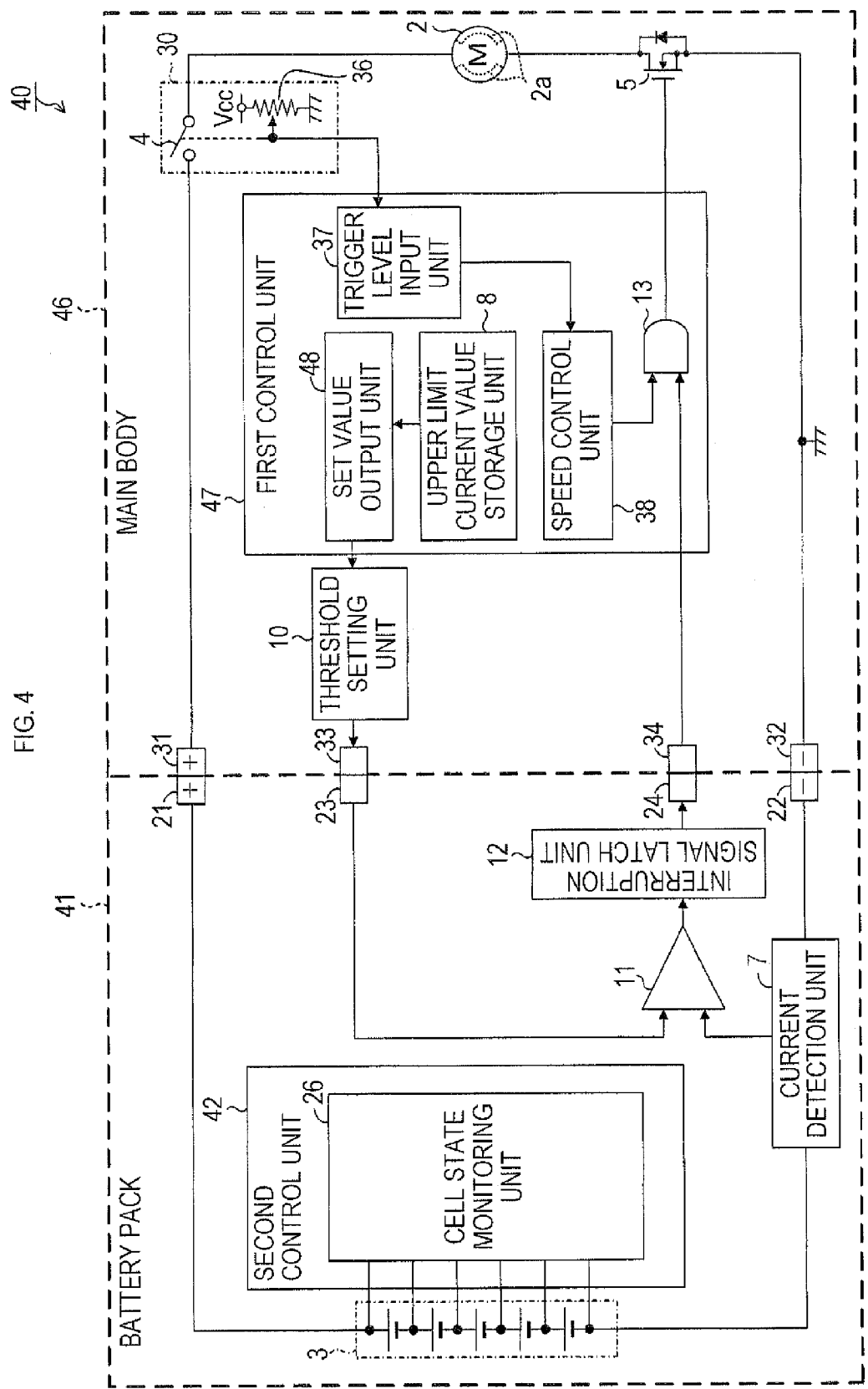
FIG. 4 is a block diagram showing an electrical configuration of a motor-driven appliance according to a third embodiment of the present invention.

Next, a motor-driven appliance 40 of a third embodiment will be described with reference to FIG. 4. The motor-driven appliance 40 of the present embodiment shown in FIG. 4 is also configured as a driver drill, similarly to the motor-driven appliance 20 of the second embodiment. Moreover, the motor-driven appliance 40 of the present embodiment is configured to include a battery pack 41 and a main body 46, to which the battery pack 41 is detachably attached, which is also similar to the second embodiment.

Some elements in the motor-driven appliance 40 of the present embodiment are the same as those in the motor-driven appliance 20 of the second embodiment shown in FIG. 2. Therefore, the elements that are the same as those of the second embodiment are assigned with the same reference numerals as those in the second embodiment, and detailed explanations of such elements are not repeated here. An explanation will be given below mainly about differences from the motor-driven appliance 20 of the second embodiment.

As shown in FIG. 4, the battery pack 41 includes the battery 3, a second control unit 42, the current detection unit 7, the current exceedance determination unit 11, and the interruption signal latch unit 12. Although the second control unit 42 includes the cell state monitoring unit 26, the second control unit 42 does not include the upper limit current value input unit 27 or the set value output unit 9 included in the second control unit 25 of the second embodiment (see FIG. 2). The threshold setting unit 10 is also not included in the battery pack 41.

In the present embodiment, the threshold setting unit 10 is provided in the main body 46. To the battery pack 41, the current threshold (analog voltage value) generated in the threshold setting unit 10 within the main body 46 is supplied, and the current threshold is directly inputted into the current exceedance determination unit 11.

The main body 46 includes the motor 2, the driving FET 5, the trigger switch unit 30, a first control unit 47, and the threshold setting unit 10. Compared with the first control unit 35 of the second embodiment (see FIG. 2), the first control unit 47 does not include the upper limit current value output unit 39 but includes a set value output unit 48. The set value output unit 48 acquires an upper limit current value from the upper limit current value storage unit 8, and calculates the current threshold based on the upper limit current value. Then, the set value output unit 48 outputs the threshold setting PWM signal indicating the calculated current threshold to the threshold setting unit 10. The threshold setting unit 10 generates the current threshold indicated by the duty ratio of the threshold setting PWM signal, and outputs the current threshold to the battery pack 41.

Since the motor-driven appliance 40 of the present third embodiment has a configuration in which the battery pack 41 is simplified as above, cost reduction of the battery pack 41 is thereby enabled. In a case such as where cost reduction is achieved while allowing the battery pack 41 to have a certain level of high functionality, the configuration as in the present third embodiment is useful.

Fourth Embodiment

Figure 5:
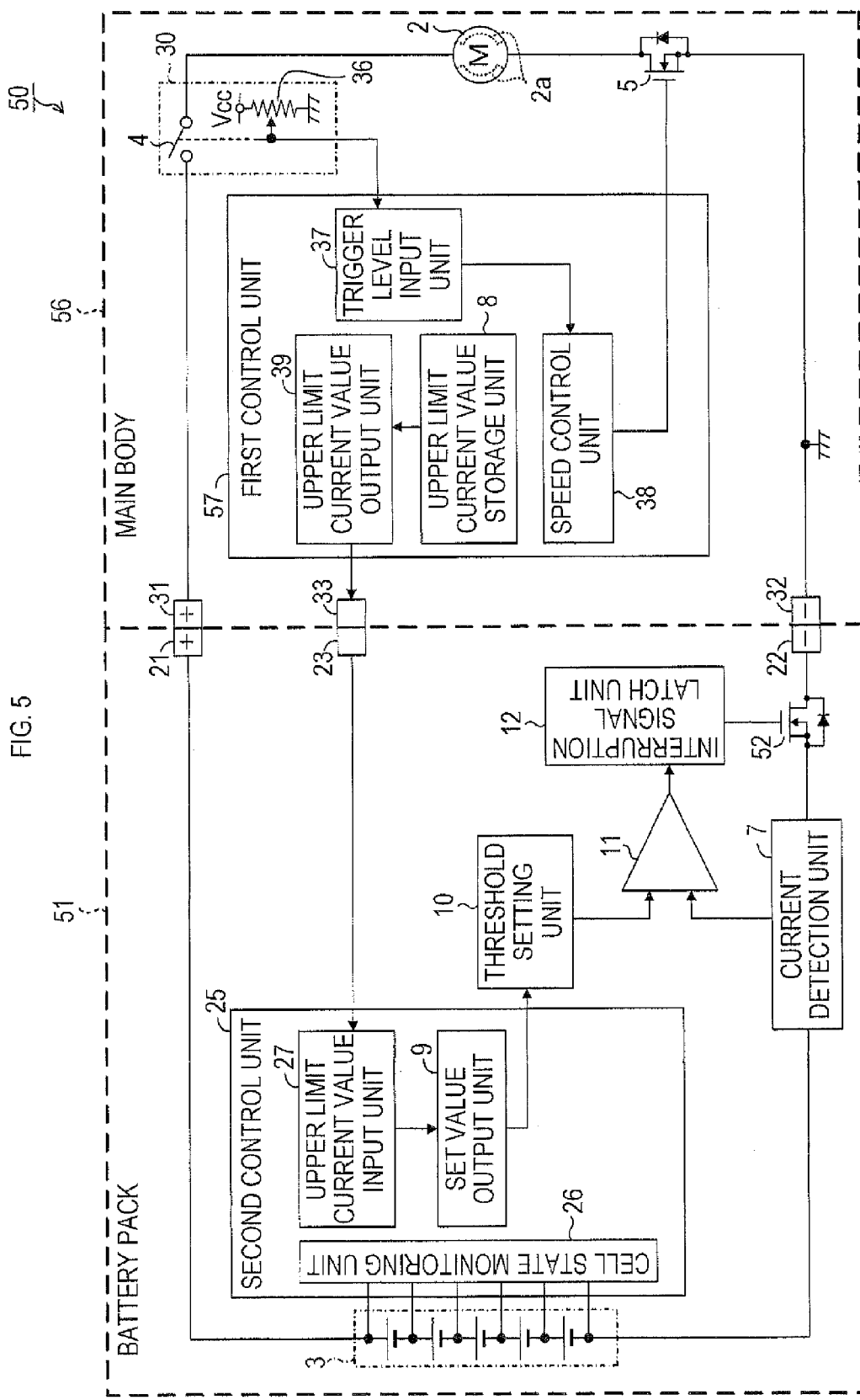
FIG. 5 is a block diagram showing an electrical configuration of a motor-driven appliance according to a fourth embodiment of the present invention.

Next, a motor-driven appliance 50 of a fourth embodiment will be described with reference to FIG. 5. The motor-driven appliance 50 of the present embodiment shown in FIG. 5 is also configured as a driver drill including a battery pack 51 and a main body 56, similarly to the motor-driven appliance 20 of the second embodiment.

Some elements in the motor-driven appliance 50 of the present embodiment are the same as those in the motor-driven appliance 20 of the second embodiment shown in FIG. 2. Therefore, the elements that are the same as those of the second embodiment are assigned with the same reference numerals as those in the second embodiment, and detailed explanations of such elements are not repeated here. An explanation will be given below mainly about differences from the motor-driven appliance 20 of the second embodiment.

Compared with the battery pack 16 of the second embodiment (see FIG. 2), the battery pack 51 of the present embodiment is different therefrom in that a path interrupting FET 52 as a current flow interruption unit is inserted in a current path between the negative terminal 22 and the current detection unit 7, and in that the latched interruption signal from the interruption signal latch unit 12 is not outputted to the main body 56 but inputted into a gate of the path interrupting FET 52 within the battery pack 51.

The path interrupting FET 52 is an N-channel MOSFET in the present embodiment, and a drain thereof is connected to the negative terminal 22, and a source thereof is connected to the current detection unit 7. The path interrupting FET 52 is turned on in a normal state in which the detected current is less than the current threshold, whereas the path interrupting FET 52 is turned off when the detected current is equal to or greater than the current threshold, to thereby interrupt the current path.

On the other hand, compared with the main body 18 of the second embodiment (see FIG. 2), the main body 56 is different therefrom in that the AND circuit 13 is not included in a first control unit 57. In the first control unit 57 of the present embodiment, the PWM drive signal from the speed control unit 38 is supplied to the gate of the driving FET 5 without passing through the AND circuit 13.

As seen from the above, in the motor-driven appliance 50 of the present fourth embodiment, current path interruption for suppressing demagnetization is performed on the part of the battery pack 51. Due to this, even in a case where this battery pack 51 is used attached to the main body 56 having no current interruption function, the current path can be interrupted on the part of the battery pack 51 when the detected current has become equal to or greater than the current threshold. In other words, demagnetization of the permanent magnets 2a in the motor 2 included in the main body 56 can be suppressed by such a function on the part of the battery pack 51, regardless of a configuration of the main body 56.

Fifth Embodiment

Figure 6:
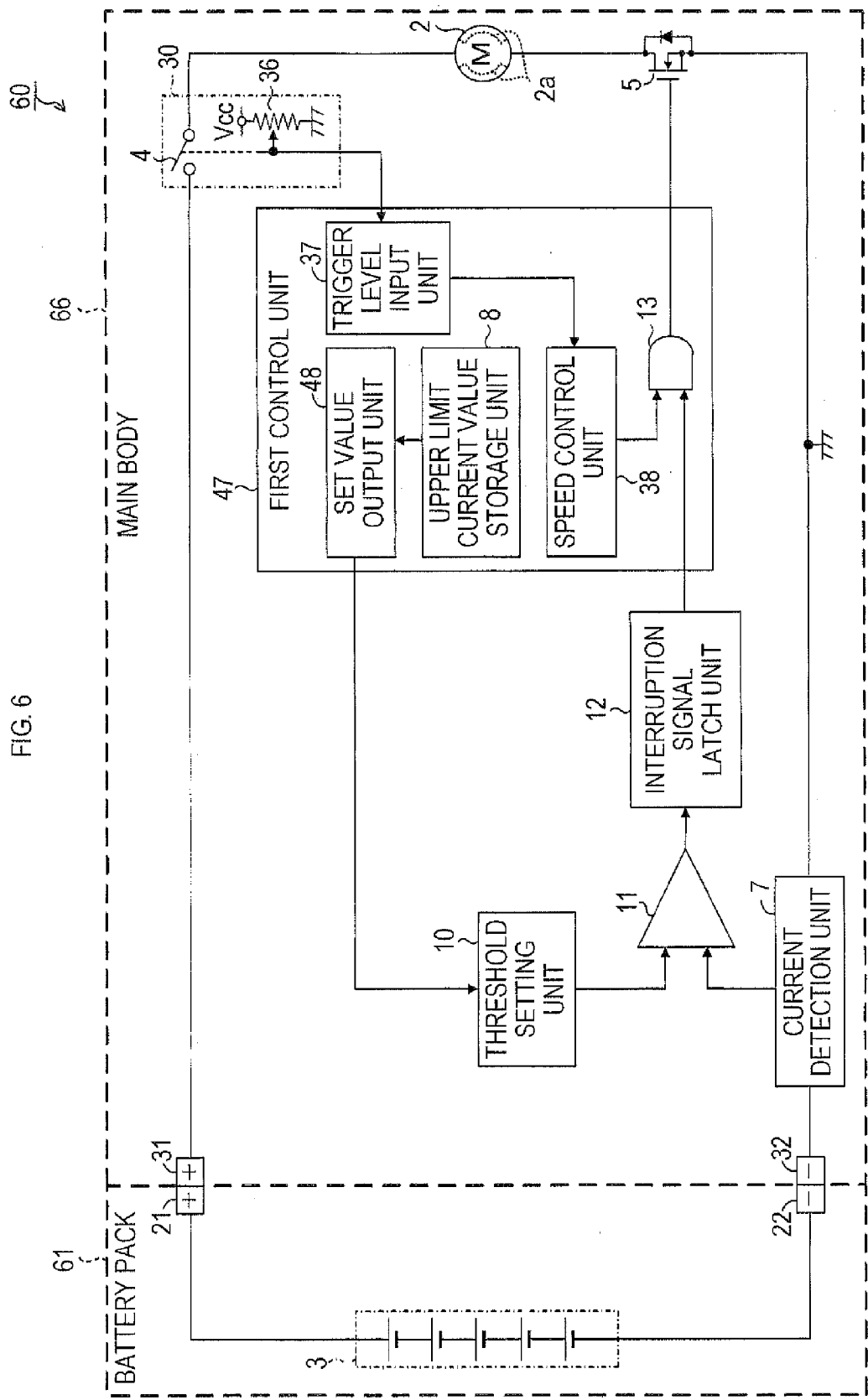
FIG. 6 is a block diagram showing an electrical configuration of a motor-driven appliance according to a fifth embodiment of the present invention.

Next, a motor-driven appliance 60 of a fifth embodiment will be described with reference to FIG. 6. The motor-driven appliance 60 of the present embodiment shown in FIG. 6 is also configured as a driver drill including a battery pack 61 and a main body 66, similarly to the motor-driven appliance 40 of the third embodiment shown in FIG. 4.

Some elements in the motor-driven appliance 60 of the present embodiment are the same as those in the motor-driven appliance 40 of the third embodiment shown in FIG. 4. Therefore, the elements that are the same as those of the third embodiment are assigned with the same reference numerals as those in the third embodiment, and detailed explanations of such elements are not repeated here. An explanation will be given below mainly about differences from the motor-driven appliance 40 of the third embodiment.

Although the battery pack 61 of the present embodiment includes the battery 3, the battery pack 61 does not include the second control unit as in the other embodiments, the current detection unit 7, the current exceedance determination unit 11, and the interruption signal latch unit 12. The battery pack 61 of the present embodiment has a very simple configuration, compared with the battery pack in each of the other embodiments.

On the other hand, the main body 66 includes, in addition to the configuration of the main body 46 of the third embodiment (see FIG. 4), the current detection unit 7, the current exceedance determination unit 11, and the interruption signal latch unit 12. That is, in the motor-driven appliance 60 of the present embodiment, almost all of the control of the motor 2 and the control for suppressing demagnetization are performed on the part of the main body 66.

Due to this, in the main body 66, each function for suppressing demagnetization can be accomplished without relying on a battery pack attached to the main body 66. Therefore, this is especially useful in a case where there is a possibility that a battery pack having a very simple configuration like the battery pack 61 of the present embodiment is attached to the main body 66.

Sixth Embodiment

Shown in the above-described fifth embodiment is the motor-driven appliance having the configuration in which almost all of the control of the motor 2 and the control for suppressing demagnetization are performed on the part of the main body 66. In contrast, in a present sixth embodiment, a motor-driven appliance configured such that most of the control of the motor 2 and the control for suppressing demagnetization are performed on the part of a battery pack will be described.

Figure 7:
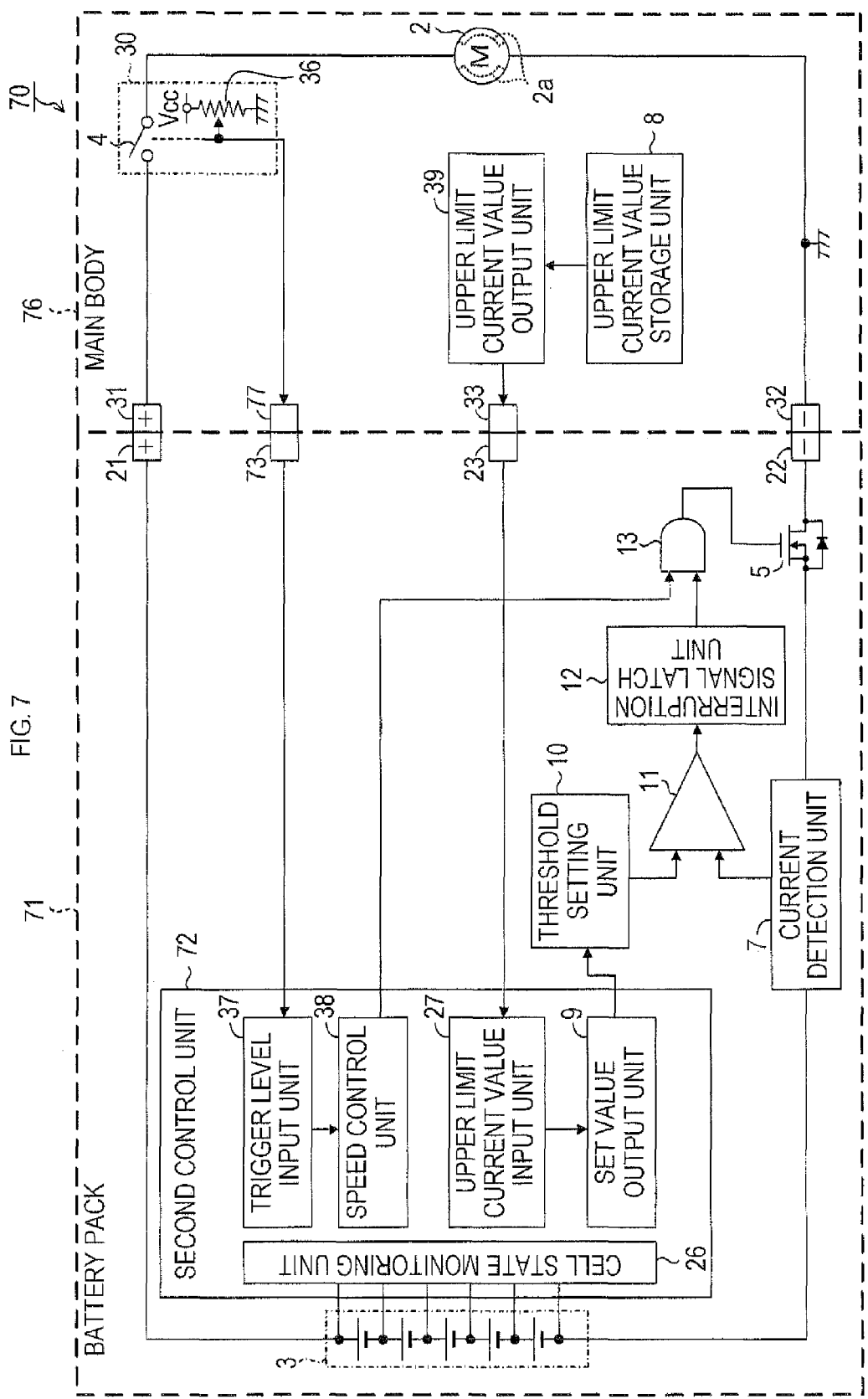
FIG. 7 is a block diagram showing an electrical configuration of a motor-driven appliance according to a sixth embodiment of the present invention.

A motor-driven appliance 70 of the present embodiment shown in FIG. 7 is also configured as a driver drill including a battery pack 71 and a main body 76, similarly to the motor-driven appliance 20 of the second embodiment.

Some elements in the motor-driven appliance 70 of the present embodiment are the same as those in the motor-driven appliance 20 of the second embodiment shown in FIG. 2. Therefore, the elements that are the same as those of the second embodiment are assigned with the same reference numerals as those in the second embodiment, and detailed explanations of such elements are not repeated here. An explanation will be given below mainly about differences from the motor-driven appliance 20 of the second embodiment.

Compared with the main body 18 of the second embodiment (see FIG. 2), the main body 76 of the present embodiment does not include the first control unit 35 or the driving FET 5. The operation amount signal from the operation amount signal output unit 36 in the trigger switch unit 30 is outputted to the battery pack 71 via an operation amount signal output terminal 77. The upper limit current value storage unit 8 and the upper limit current value output unit 39 are provided in the main body 76, and the upper limit current value is outputted from the upper limit current value output unit 39 to the battery pack 71 via the upper limit current value output terminal 33.

On the other hand, compared with the battery pack 16 of the second embodiment (see FIG. 2), the battery pack 71 is different therefrom in that the AND circuit 13 and the driving FET 5 are provided therein, and in that the trigger level input unit 37 and the speed control unit 38 are provided within a second control unit 72.

In the present embodiment, the driving FET 5 is inserted in a current path between the negative terminal 22 of the battery pack 71 and the current detection unit 7, in a manner completely the same as the path blocking FET 52 within the battery pack 51 of the fourth embodiment. To the gate of the driving FET 5, the drive signal from the AND circuit 13 is supplied.

Within the second control unit 72, the operation amount signal inputted from the main body 76 via an operation amount signal input terminal 73 is supplied to the trigger level input unit 37, and the trigger level input unit 37 generates operation amount information based on the operation amount signal and outputs the operation amount information to the speed control unit 38. The speed control unit 38 generates the PWM drive signal based on the operation amount information, and outputs the PWM drive signal to the AND circuit 13.

Accordingly, the driving FET 5 provided in the battery pack 71 is turned on and off in accordance with the PWM drive signal from the speed control unit 38 and an output signal from the interruption signal latch unit 12, similarly to the driving FET 5 provided in the main body 18 of the second embodiment. That is, the current control (speed control) of the motor 2 in accordance with the amount of pulling operation of the trigger and forcible interruption of the current path for suppressing demagnetization are both achieved by turning on and off the driving FET 5.

By accomplishing most of the various functions for current control of the motor 2 and suppression of demagnetization within the battery pack 71 as above, it becomes possible to suppress demagnetization while realizing simplification of the configuration of the main body 76. In the present embodiment, the second control unit 72 corresponds to an example of a control unit of the present invention, and the driving FET 5 corresponds to an example of a switching element of the present invention.

Seventh Embodiment

Figure 8:
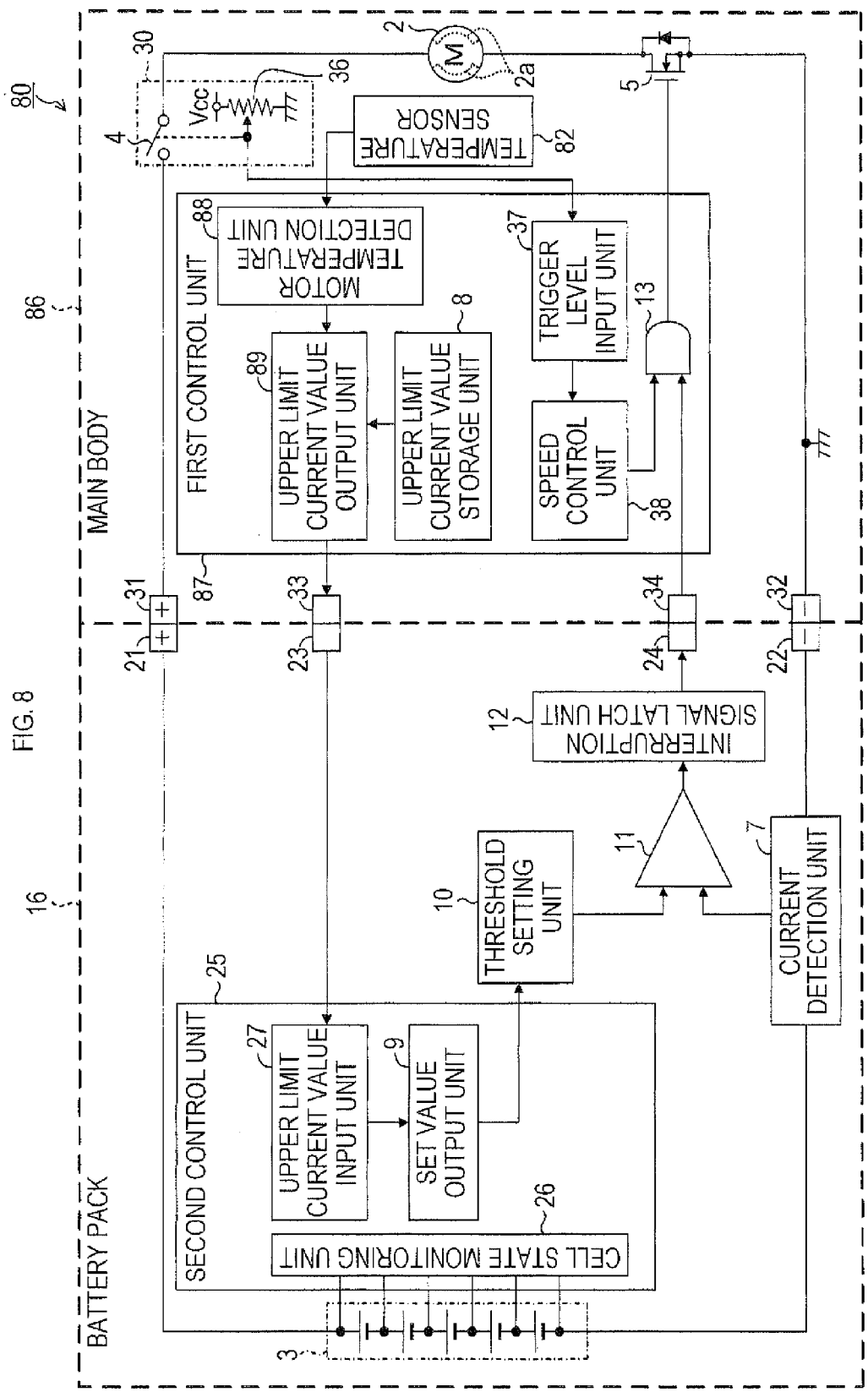
FIG. 8 is a block diagram showing an electrical configuration of a motor-driven appliance according to a seventh embodiment of the present invention.

Next, a motor-driven appliance 80 of a seventh embodiment will be described with reference to FIG. 8. The motor-driven appliance 80 of the present embodiment shown in FIG. 8 is also configured as a driver drill including the battery pack 16 and a main body 86, similarly to the motor-driven appliance 20 of the second embodiment shown in FIG. 2.

Some elements in the motor-driven appliance 80 of the present embodiment are the same as those in the motor-driven appliance 20 of the second embodiment shown in FIG. 2. Therefore, the elements that are the same as those of the second embodiment are assigned with the same reference numerals as those in the second embodiment, and detailed explanations of such elements are not repeated here. An explanation will be given below mainly about differences from the motor-driven appliance 20 of the second embodiment.

In the motor-driven appliance 80 of the present embodiment, the battery pack 16 is completely the same as the battery pack 16 of the second embodiment. On the other hand, compared with the main body 18 of the second embodiment (see FIG. 2), the main body 86 is different therefrom in that it includes a temperature sensor 82 and in that a motor temperature detection unit 88 is provided within a first control unit 87. Furthermore, a function of an upper limit current value output unit 89 within the first control unit 87 is also different in part from that of the upper limit current value output unit 39 within the first control unit 35 of the second embodiment.

The temperature sensor 82 is provided in the vicinity of the motor 2 in order to detect a temperature of the motor 2. The temperature sensor 82 may be constituted by a thermosensor such as a thermistor, for example.

In the motor temperature detection unit 88 within the first control unit 87, an analog temperature detection signal corresponding to the temperature detected by the temperature sensor 82 is inputted from the temperature sensor 82. The motor temperature detection unit 88 calculates a temperature of the motor 2 based on the temperature detection signal inputted from the temperature sensor 82, and outputs the temperature of the motor 2 to the upper limit current value output unit 89.

The upper limit current value output unit 89 acquires the upper limit current value from the upper limit current value storage unit 8, and corrects the acquired upper limit current value in accordance with the temperature of the motor 2.

As has been already described above, demagnetization characteristics of permanent magnets can be affected by changes in temperature, and vary depending on a type (material) of the permanent magnets. Due to this, in order to accomplish suppression of demagnetization more adequately, it is preferable to generate the current threshold also in consideration of a temperature of the permanent magnets. Thus, in the present embodiment, the upper limit current value output unit 89 corrects the upper limit current value according to the temperature of the motor 2. The permanent magnets 2a are mounted on an inner peripheral surface of a cylindrical stator within the motor 2. Therefore, the temperature detected by the temperature sensor 82 is close to the temperature of the permanent magnets 2a within the motor 2 and, thus, may be treated as the temperature of the permanent magnets 2a.

In a case, for example, where the demagnetization characteristics of the permanent magnets 2a are such that the lower the temperature is, the more easily demagnetization is caused, the upper limit current value output unit 89 corrects the upper limit current value acquired from the upper limit current value storage unit 8 based on the detected temperature such that the lower the temperature is, the lower the upper limit current value becomes. Due to this, the lower the temperature is, the lower the current threshold is to be set.

By reflecting the temperature of the permanent magnets 2a in generating the current threshold as above, it becomes possible to effectively suppress demagnetization even when the motor-driven appliance 80 is used under various temperature environments. In the present embodiment, the temperature sensor 82 corresponds to an example of a temperature detection unit of the present invention.

Other Embodiments (1) In the motor-driven appliance 20 of the second embodiment shown in FIG. 2, the threshold setting unit 10 may be designed to be included within the second control unit 25. In contrast, the set value output unit 9 may be configured separately from the second control unit 25. The same applies to the motor-driven appliances 50, 70, and 80 shown in FIG. 5, FIG. 7, and FIG. 8, respectively.

(2) In the motor-driven appliance 40 of the third embodiment shown in FIG. 4, the threshold setting unit 10 may be designed to be included within the first control unit 47 or may be designed to be included within the battery pack 41. The same applies to the motor-driven appliance 60 shown in FIG. 6.

(3) The motor-driven appliance 20 of the second embodiment shown in FIG. 2 may be designed such that the main body 18 is provided with the path interrupting FET separately from the driving FET 5; the driving FET 5 is turned on and off by the PWM drive signal from the speed control unit 38; and the path interrupting FET is turned on and off by the latched interruption signal from the battery pack 16. The same applies to the motor-driven appliances 1, 40, 60, 70, and 80 shown in FIG. 1, FIG. 4, FIG. 6, FIG. 7, and FIG. 8, respectively.

(4) A specific configuration for generating the current threshold based on the upper limit current value is not limited to the configurations shown in the above-described respective embodiments. For example, a configuration is possible in which the current threshold (digital value) is calculated based on the upper limit current value within the control unit; the calculated current threshold is converted into an analog signal by means of a DA converter provided within or outside the control unit; and the analog signal is outputted to the current exceedance determination unit 11.

Alternatively, for example, a configuration is possible in which a digital potentiometer is provided and the current threshold (digital value) calculated based on the upper limit current value is supplied to the digital potentiometer, to thereby cause an analog current threshold to be outputted from the digital potentiometer.

A specific circuit or the like for generating the current threshold based on the upper limit current value stored in the upper limit current value storage unit 8 and for outputting the current threshold to the current exceedance determination unit 11 may be configured variously as long as such a function can be accomplished, and the configurations shown in the above-described respective embodiments are merely examples.

(5) Although the upper limit current value stored in the upper limit current value storage unit 8 is a maximum value (maximum limit value) of a current that has no risk of causing demagnetization of the permanent magnets 2a when such a current is caused to flow in the motor 2 (even momentarily) in the above-described embodiments, it is not essential to set the upper limit current value to the maximum limit value as above.

For example, the upper limit current value may be set to a predetermined value equal to or less than the maximum limit value. On the other hand, there may be a case in which the upper limit current value is set to a predetermined value in a range greater than the maximum limit value (i.e., in a range in which demagnetization could be caused). In this case, it is recommended that the set value output unit 9 is designed, for example, to calculate the current threshold with appropriate margin, considering to what extent the upper limit current value is greater than the maximum limit value.

In the case where it is determined by the current exceedance determination unit 11 that the detected current is equal to or greater than the current threshold, to what value the upper limit current value is to be set and how the current threshold is to be calculated based on the thus-set upper limit current value can be arbitrarily determined, as long as the current flowing in the motor 2 can be forcibly interrupted before the current flowing in the motor 2 exceeds the maximum limit value (or the upper limit current value).

(6) To constitute the current exceedance determination unit 11 by an analog comparator is also merely an example. As long as it is possible to determine whether the detected current has become equal to or greater than the current threshold without going through a software process by a computer and to output a signal indicating the detection result, a specific hardware circuit configuration of the current exceedance determination unit 11 is not limited in particular.

A configuration is also possible in which a microcomputer as each control unit and the current exceedance determination unit 11 (e.g., an analog comparator) are housed in one package like an SIP (system-in-package).

(7) A configuration is also possible in which, aside from the first control unit or the second control unit, a third circuit or the like is provided that is designed to perform tasks ranging from readout of the upper limit current value to generation of the threshold information (such as the threshold setting PWM signal) (or further, to generation of the current threshold to be inputted into the current exceedance determination unit 11).

(8) The second control unit included in the battery pack may be configured to be also equipped with an overcurrent detection function, an overload detection function, an overdischarge detection function, and the like, which are generally provided to a microcomputer of a conventional battery pack, in addition to the respective functions (cell state monitoring, calculation of the current threshold, and the like) in the above-described respective embodiments.

(9) In the above-described embodiments, the first control unit and the second control unit may be constituted by, for example, an ASIC, an FPGA, other ICs of various types, a logic circuit, or the like, not being limited to the microcomputer.

(10) Although the motor 2 of the above-described embodiments is a brushed DC motor, the present invention can be applied to motor-driven appliances including other motors of various types having permanent magnets provided therein.

(11) Although examples in which the present invention is applied to an electric power tool (specifically, a driver drill) are shown in the above-described embodiments, the present invention can be applied not just to an electric power tool but to any kinds of motor-driven appliances such as a motor-driven operating device like a brush cutter, for example.

It is to be noted that the present invention is not limited to specific means, structures, or the like shown in the above-described embodiments, and various forms can be adopted within the scope not departing from the spirit of the present invention. Moreover, modes in which a part of the structure in the above-described embodiments is omitted to an extent that allows problems to be solved are also embodiments of the present invention and, furthermore, modes configured by properly combining more than one embodiment described above are also embodiments of the present invention.

What is claimed is:

1. A motor-driven appliance comprising:
a battery;
a battery pack having at least the battery housed therein;
a motor that includes permanent magnets as field magnets and is operated by electric power from the battery;
a momentary maximum current upper limit storage unit in which a predetermined momentary maximum current upper limit is stored;
a main body to which the battery pack is detachably attached and which has at least the motor and the momentary maximum current upper limit storage unit mounted therein;
a current detection unit that detects a current flowing in the motor;
a current threshold setting unit that generates a current threshold based on the momentary maximum current upper limit stored in the momentary maximum current upper limit storage unit, and outputs the generated current threshold;
a current exceedance determination unit that determines whether the current detected by the current detection unit has become equal to or greater than the current threshold, and outputs an interruption signal used to interrupt a current path from the battery to the motor when the detected current has become equal to or greater than the current threshold; and
a current flow interruption unit that interrupts the current path when the interruption signal is outputted from the current exceedance determination unit.

2. The motor-driven appliance according to claim 1, wherein the momentary maximum current upper limit is a value set in advance based on a current value that causes demagnetization of the permanent magnets when such a current is caused to flow to the motor.

3. The motor-driven appliance according to claim 2, wherein the momentary maximum current upper limit is a maximum value of a current that has no risk of causing demagnetization of the permanent magnets when such a current is caused to flow to the motor, or a predetermined value less than the maximum value.

4. The motor-driven appliance according to claim 1, wherein the current threshold setting unit is configured to generate, as the current threshold, a value lower than the momentary maximum current upper limit by a predetermined amount, the value being decided so that the current path is interrupted by the current flow interruption unit before the current flowing in the motor exceeds the momentary maximum current upper limit when the current exceedance determination unit determines that the detected current is equal to or greater than the current threshold based on the momentary maximum current upper limit stored in the momentary maximum current upper limit storage unit.

5. The motor-driven appliance according to claim 1, wherein the current exceedance determination unit is configured to perform determination of whether the current detected by the current detection unit has become equal to or greater than the current threshold and output of the interruption signal, by a hardware circuit without going through a software process by a computer.

6. The motor-driven appliance according to claim 1, wherein the main body includes a first control unit that controls the motor;
wherein the first control unit is configured to accomplish, from among functions of the current threshold setting unit, at least an acquisition function for acquiring the momentary maximum current upper limit stored in the momentary maximum current upper limit storage unit; and
wherein the current threshold setting unit is configured to generate the current threshold based on the momentary maximum current upper limit acquired by the acquisition function.

7. The motor-driven appliance according to claim 6, wherein the battery pack includes a second control unit that monitors a state of the battery,
wherein the first control unit is designed to accomplish the acquisition function from among the functions of the current threshold setting unit, and includes an upper limit information output unit that acquires the momentary maximum current upper limit stored in the momentary maximum current upper limit storage unit and outputs upper limit information indicating the momentary maximum current upper limit to the second control unit, wherein the second control unit is configured to accomplish, from among the functions of the current threshold setting unit, at least a current threshold setting information generation function that acquires the upper limit information outputted from the upper limit information output unit in the main body and generates current threshold setting information indicating the current threshold based on the upper limit information, and wherein the current threshold setting unit includes a threshold generation unit that is provided in the battery pack and generates the current threshold based on the current threshold setting information generated by the current threshold setting information generation function in the second control unit.

8. The motor-driven appliance according to claim 1, wherein the battery pack includes:
   the current exceedance determination unit; and
   an interruption signal output unit that outputs the interruption signal to the main body when the current exceedance determination unit determines that the detected current has become equal to or greater than the current threshold, and
wherein the current flow interruption unit is mounted in the main body, and is configured to interrupt the current path when the interruption signal is inputted from the battery pack.

9. The motor-driven appliance according to claim 1, wherein the current exceedance determination unit and the current flow interruption unit are mounted in the battery pack.

10. The motor-driven appliance according to claim 1, wherein the current detection unit, the current threshold setting unit, the current exceedance determination unit, and the current flow interruption unit are mounted in the main body.

11. The motor-driven appliance according to claim 1, wherein the main body includes:
   an operation switch; and
   an operation amount signal output unit that outputs an operation amount signal indicating an operation amount of the operation switch to the battery pack,
wherein the battery pack includes:
   the current detection unit;
   the current threshold setting unit;
   the current exceedance determination unit;
   the current flow interruption unit;
   a switching element that conducts and interrupts the current path from the battery to the motor; and
   a control unit that controls the current flowing from the battery to the motor by turning on and off the switching element based on the operation amount signal inputted from the main body, and
wherein the current flow interruption unit is configured to interrupt the current path by forcibly turning off the switching element when the interruption signal is outputted from the current exceedance determination unit.

12. The motor-driven appliance according to claim 1, wherein the current threshold setting unit is configured to generate the current threshold of an analog form and outputs the generated current threshold to the current exceedance determination unit.

13. The motor-driven appliance according to claim 1, including a temperature detection unit that detects a temperature of the permanent magnets in the motor directly or indirectly,
wherein the current threshold setting unit is configured to generate the current threshold based on the momentary maximum current upper limit and the temperature detected by the temperature detection unit.

14. A battery pack used attached to a main body of a motor-driven appliance, the battery pack comprising:
   a battery that supplies electric power to a motor that is mounted in the main body and includes permanent magnets as field magnets;
   a battery pack having at least the battery housed therein;
   a current detection unit that detects a current flowing from the battery to the motor;
   a current threshold setting unit that generates a current threshold based on a momentary maximum current upper limit stored in the main body, and outputs the generated current threshold;
   a main body to which the battery pack is detachably attached and which has at least the motor and the momentary maximum current upper limit storage unit mounted therein; and
   a current exceedance determination unit that determines whether the current detected by the current detection unit has become equal to or greater than the current threshold, and outputs an interruption signal used to interrupt a current path from the battery to the motor when the detected current has become equal to or greater than the current threshold.

* * * * *